United States Patent Office 3,159,633
Patented Dec. 1, 1964

3,159,633
METHYLATION OF PIPERAZINES
William K. Langdon, Grosse Ile, Mich., and Harry Rubinstein, Bethlehem, Pa., assignors to Wyandotte Chemicals Corporation, Wyandotte, Mich., a corporation of Michigan
No Drawing. Filed June 21, 1961, Ser. No. 118,539
6 Claims. (Cl. 260—268)

This invention relates to a process for the preparation of N,N'-dimethylpiperazines. More particularly, this invention relates to a process for preparing N,N'-dimethylpiperazines in high conversions.

The use of formaldehyde to methylate amines and ammonia is not new in the art. Eschweiler (Ber., 28c, 581 (1895); Ber., 38, 880 (1905)) first described the methylation of ammonia and amines with formaldehyde. In this process the methylation reaction is carried out in a pressure vessel at a temperature of about 130 to 160° C. and at a pressure of about 1,000 p.s.i.g. The difficulties and potential hazards of these reaction conditions are apparent since one of the products of the reaction is carbon dioxide gas. The application of Eschweiler's process to the preparation of N,N'-dimethylpiperazines has resulted in low conversions and a product containing a considerable amount of entrapped carbon dioxide gas, which makes it difficult to separate and recover the desired product. Therefore, it is readily apparent that the Eschweiler process has several disadvantages.

Subsequently, Clarke et al. (J. Am. Chem. Soc., 55, 4571 (1933)) modified the Eschweiler process by carrying out the reaction at atmospheric pressure in the presence of formaldehyde and an excess of formic acid. While the Clarke et al. process improved conversion some, the high cost of the formic acid is undesirable.

Kirby (U.S. 2,366,534) extended the Clarke et al. process to long chain tertiary amines. Subsequently, Erickson (U.S. 2,776,314) modified the Kirby process for methylating long chain amines by substituting sulfuric acid for part of the formic acid and obtained higher yields and a reduction in cost. The Erickson process requires the presence of sufficient sulfuric acid to fully neutralize the amine and preferably an excess of sulfuric acid to obtain high yields of the methylated amine. However, it has been found that when this process is extended to piperazines high conversions are not obtained.

It is apparent from the foregoing that each of the processes described has certain disadvantages which render it undesirable for the production of N,N'-dimethylpiperazines.

Therefore, an object of this invention is to provide a new and improved process for producing N,N'-dimethylpiperazines.

Another object of this invention is to provide a process for producing N,N'-dimethylpiperazines with high conversions.

The foregoing objects and other objects are accomplished by mixing a piperazine compound corresponding to the formula:

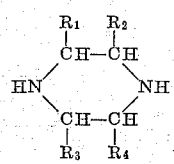

wherein $R_1$, $R_2$, $R_3$ and $R_4$ may be hydrogen, methyl or ethyl radicals which may be the same or different, with about 2 to 2.4 mols of formaldehyde and about 2 to 2.4 mols of formic acid per mol of said piperazine compound in the presence of about ⅔ to 1.5 mols of phosphoric acid per mol of piperazine compound. The reaction proceeds smoothly at a temperature of about 40 to 100° C. and at about atmospheric pressure.

It was surprising and unexpected indeed when, contrary to the teachings of the prior art, it was discovered that the complete neutralization of both amino groups of the piperazine compound with phosphoric acid resulted in a material improvement in conversion to the corresponding N,N'-dimethylpiperazine. The use of phosphoric acid is completely contrary to the aforesaid Erickson patent which teaches the employment of sulfuric acid to fully neutralize the piperazine compound and teaches that phosphoric acid cannot be used to replace sulfuric acid. In addition, it was unexpectedly found that full neutralization of both amino groups of the piperazine molecule with phosphoric acid resulted in considerably higher conversions (90%) than full neutralization with sulfuric acid (79%) and resulted in conversions that greatly exceed the conversion obtained by the Clarke et al. process (68%). The process of this invention can also be carried out at a lower temperature than the Erickson process.

The N,N'-dimethylpiperazines prepared by the process of this invention include both N,N'-dimethylpiperazine and N,N'-dimethylpiperazines having alkyl-substituted carbon atoms. Thus the compounds are tertiary amines which are useful as urethane foam catalysts and epoxy curing agents and may be represented by the following formula:

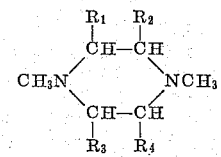

wherein $R_1$, $R_2$, $R_3$ and $R_4$ may be hydrogen, methyl or ethyl radicals which may be the same or different.

Representative of the piperazine compounds which may be employed in the reaction are piperazine,
2-methylpiperazine,
2,5-dimethylpiperazine,
2,6-dimethylpiperazine,
2,3-dimethylpiperazine,
2,3,5-trimethylpiperazine,
2,3,5,6-tetramethylpiperazine,
2-ethylpiperazine,
2,5-diethylpiperazine,
2,6-diethylpiperazine,
2,3,5,6-tetraethylpiperazine,
2-ethyl-5-methylpiperazine,
2,5-diethyl-3-methylpiperazine,
2-ethyl-3,5-dimethylpiperazine,
2,6-diethyl-3,5-dimethylpiperazine,
2-ethyl-3,5,6-trimethylpiperazine, and the like.

The formaldehyde and formic acid are present in their theoretical amounts and preferably in slight excesses of about 10 to 20%. Larger excesses may be employed but are not recommended for economical reasons. Therefore the formaldehyde and formic acid are both present in the proportion of about 2 to about 2.4 mols per mol of piperazine compound.

The formaldehyde employed may be either in the form of an aqueous solution of formaldehyde or as paraformaldehyde. Both forms are readily available commerically. Commercially available formic acid containing 85 to 90% formic acid is also satisfactory for use in this reaction.

The quantity of phosphoric acid employed in the reaction must be sufficient to fully neutralize the piperazine compound. Therefore at least about ⅔ mol of phosphoric acid per mol of piperazine should be employed and preferably a slight excess should be present. Thus a suitable range is ⅔ to 1.5 mols of phosphoric acid per mol of piperazine. A preferred phosphoric acid concentration is about 1 mol per mol of piperazine which has resulted in excellent conversions of piperazines to the corresponding N,N'-dimethylpiperazines.

In carrying out the methylation reaction the order of mixing the reactants may vary. Preferably the piperazine compound is added slowly to the formaldehyde while stirring and cooling to maintain the temperature of the reaction mixture below about 50° C. The phosphoric acid is then added and followed by addition of formic acid slowly at a rate such that the evolution of carbon dioxide gas is only moderate. After the addition of all the reactants is complete, the reaction is carried out at a temperature in the range of 40 to 100° C. While temperature has been found to increase the rate of reaction, it is desirable to carry out the reaction at a temperature not greater than about 70° C. initially because of the violent evolution of carbon dioxide. Temperatures below 40° C. are not suitable because of the slow rate of reaction. Subsequently the temperature of the reaction mixture may be increased if desired and the reaction completed by refluxing the mixture. High conversions have been obtained when the reaction was carried out below 70° C. for about 2 hours and then carried out above 70° C. for about 2 hours until the reaction was completed. Completion of the reaction coincides with the ceasing of the carbon dioxide gas evolution from the reaction mixture. The recovery of the reaction product may be accomplished by several different methods. However, preferably the excess acid in the reaction mixture is neutralized with 50% sodium hydroxide and at the same time water is added to prevent crystallization of sodium phosphate from the mixture. The methylated piperazine layer which separates is washed with 50% sodium hydroxide, diluted with water and then azeotropically distilled. The water-N,N'-dimethylpiperazine azeotrope is collected and may be dried over 50% sodium hydroxide and fractionated if the anhydrous N,N'-dimethylpiperazine is desired. Conversions of up to 90% have been obtained from the process of this invention.

The following example is set forth to illustrate the process of the invention and should not be used to unduly restrict the scope of the invention as it has been described herein. The percent conversion to the N,N'-dimethylpiperazine product reported in the example and previously mentioned was calculated as follows:

Percent conversion to N,N'-dimethylpiperazine (product)

$$= \frac{\text{mols of product obtained}}{\text{mols of piperazine charged}} \times 100$$

*Example*

A five-liter, three-necked flask equipped with stirrer, reflux condenser, thermometer and addition funnel was charged with 792 grams (13.2 mols) of 50% formaldehyde solution. From the funnel 753 grams (6.0 mols) of 79.6% 2-methylpiperazine were added while the temperature was held below 40° C. After the piperazine addition was completed, 692 grams (13.2 mols) of 85% phosphoric acid and then 675 grams (13.2 mols) of 90% formic acid were added. The reaction mixture was stirred for about 2 hours with the temperature held within the range of 41–68° C. and then the temperature was increased to 70–78° C. for 2 hours at which time the carbon dioxide gas evolution subsided. To recover the 1,2,4-trimethylpiperazine product the mixture was diluted with water and neutralized with 50% sodium hydroxide. The piperazine layer which separated was washed with 50% sodium hydroxide solution, diluted, and distilled. The 96–99° C. water-1,2,4-trimethylpiperazine azeotrope fraction was collected. 1935 grams of the water-piperazine azeotrope were obtained which had an analysis of 35.5% 1,2,4-trimethylpiperazine and the conversion calculated to be 90%.

It will be apparent from the foregoing description that the objects of this invention has been attained. A new and improved process for preparing N,N'-dimethylpiperazines has been invented that results in high conversions of piperazines to the corresponding N,N'-dimethylpiperazines at low reaction temperatures.

We claim:

1. A process for preparing N,N'-dimethylpiperazines which comprises contacting a piperazine compound corresponding to the formula:

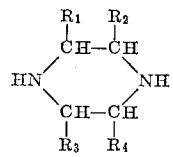

wherein $R_1$, $R_2$, $R_3$ and $R_4$ are members selected from the group consisting of hydrogen, methyl and ethyl radicals with about 2 to 2.4 mols of formaldehyde and about 2 to 2.4 mols of formic acid per mol of said piperazine compound in the presence of about ⅔ to 1.5 mols of phosphoric acid per mol of said piperazine compound at a temperature of about 40 to 100° C. and at about atmospheric pressure.

2. A process for preparing N,N'-dimethylpiperazines which comprises contacting a piperazine compound corresponding to the formula:

wherein $R_1$, $R_2$, $R_3$ and $R_4$ are members selected from the group consisting of hydrogen, methyl and ethyl radicals with about 2 to 2.4 mols of formaldehyde and about 2 to 2.4 mols of formic acid per mol of said piperazine compound in the presence of about 1.0 mol of phosphoric acid per mol of said piperazine compound at a temperature of about 40 to 100° C. and at about atmospheric pressure.

3. A process according to claim 2 wherein said piperazine compound is piperazine.

4. A process according to claim 2 wherein said piperazine compound is 2-methylpiperazine.

5. A process according to claim 2 wherein said piperazine compound is 2,5-dimethylpiperazine.

6. A process according to claim 2 wherein said piperazine compound is 2,6-dimethylpiperazine.

References Cited in the file of this patent

UNITED STATES PATENTS

| | | |
|---|---|---|
| 2,366,534 | Kirby | Jan. 2, 1945 |
| 2,636,032 | Weston et al. | Apr. 21, 1953 |
| 2,776,314 | Erickson | Jan. 1, 1957 |
| 2,778,826 | Schmidle | Jan. 22, 1957 |

OTHER REFERENCES

Mann et al.: Journal Chemical Society, London, pages 4476–4480 (1954).

McElrain et al.: Journal American Chemical Society, vol. 76, pages 1126–1137 (1954).

Clarke et al.: Journal American Chemical Society, vol. 55, pages 4571–4587 (1933).